July 30, 1957 W. H. SMITH 2,800,788
GLOVE TESTING APPARATUS
Filed May 14, 1956 3 Sheets-Sheet 1

INVENTOR
Willard H. Smith

BY Beale & Jones
ATTORNEYS

July 30, 1957 W. H. SMITH 2,800,788
GLOVE TESTING APPARATUS
Filed May 14, 1956 3 Sheets-Sheet 2
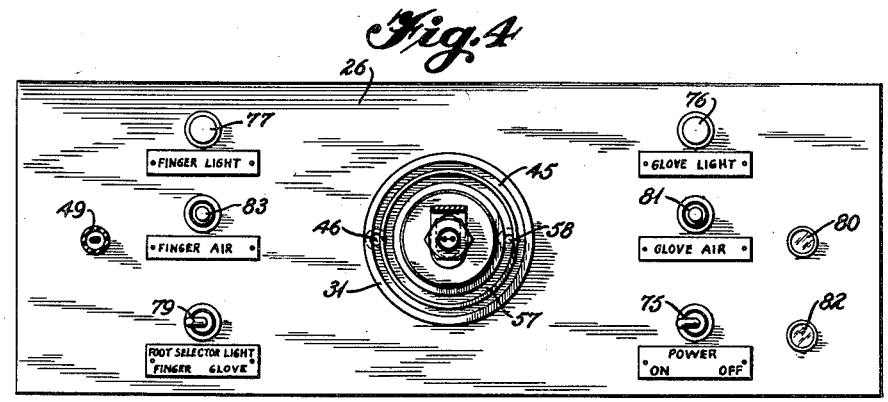
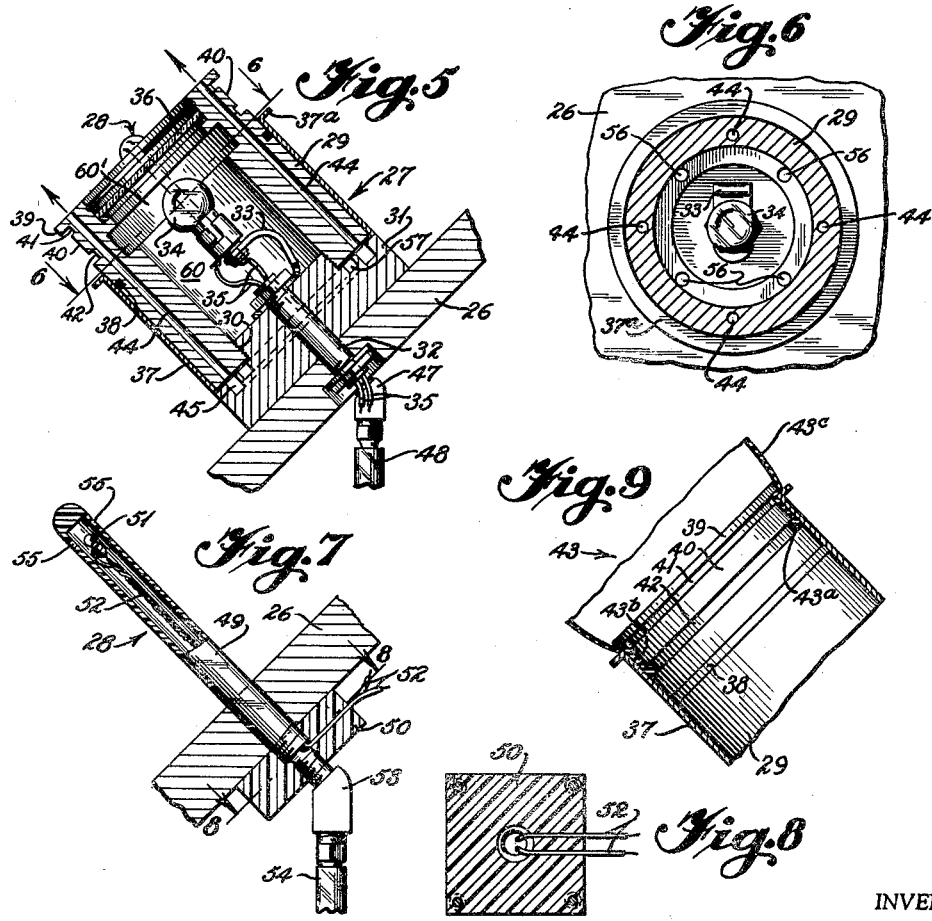
INVENTOR
Willard H. Smith
BY
Beale & Jones
ATTORNEYS

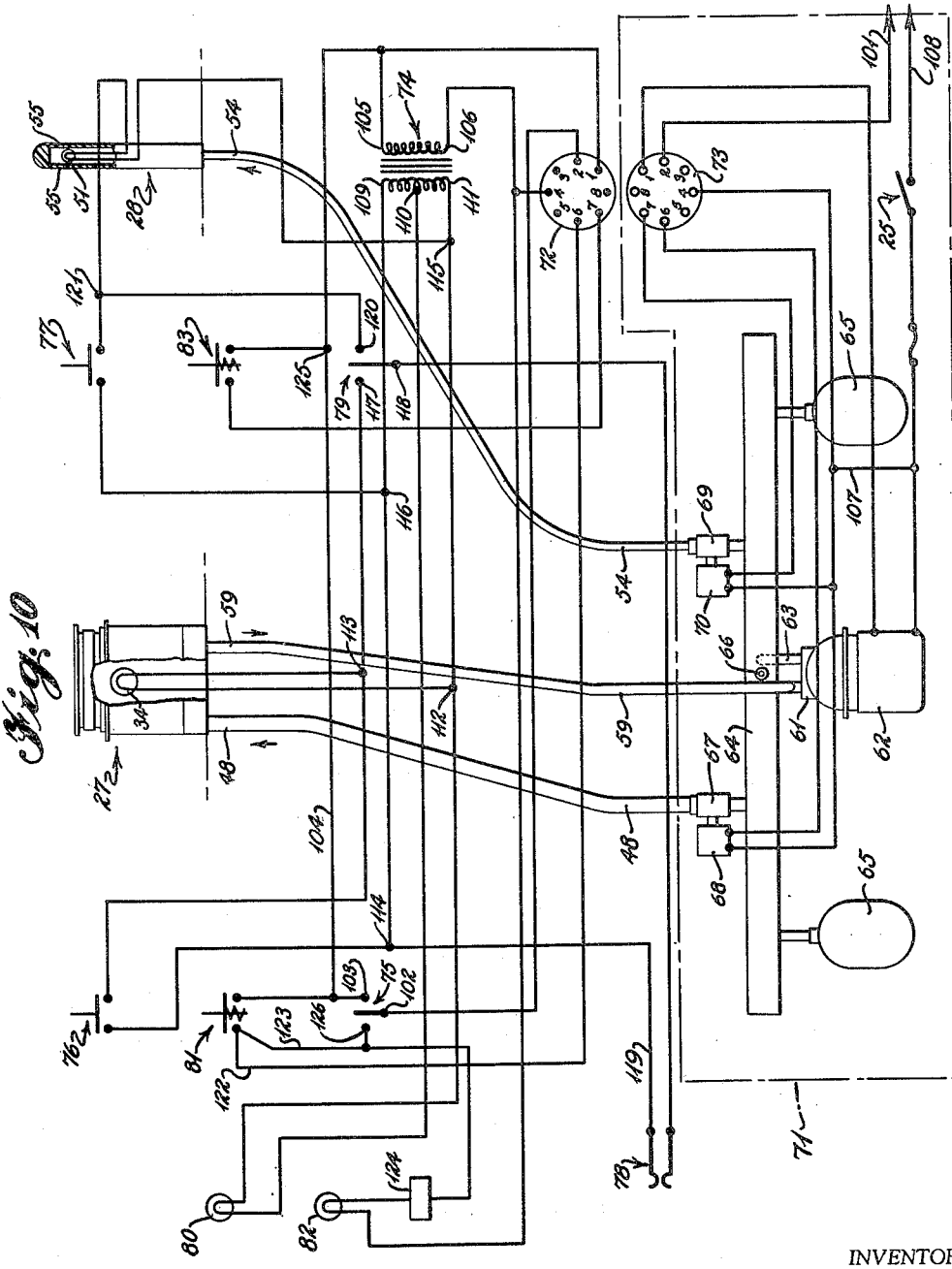

United States Patent Office 2,800,788
Patented July 30, 1957

2,800,788

GLOVE TESTING APPARATUS

Willard H. Smith, Arlington, Va.

Application May 14, 1956, Serial No. 584,713

2 Claims. (Cl. 73—40)

This invention relates to apparatus for testing and inspecting gloves, particularly rubber surgical gloves and the like.

Devices have heretofore been developed for testing such gloves in which means is provided for inflating or distending the glove and illuminating or blowing powder or smoke into the glove to facilitate the location of small holes. It is an object of the present invention to provide improved apparatus of this general character.

Prior art apparatus with which I am familiar have one or more undesirable features. Of those which provide means for inflating the glove and illuminating it from within the illumination is inadequate. Some use only a very small electric light bulb of too small candlepower or attempt to use powder or smoke to be blown through the small holes. In these cases very small holes will not permit the passage of even such small particles and this technique is ineffective. In all of the devices with which I am familiar if sufficient illumination were used, the fixture against which the glove wrist would necessarily be pressed would become overheated by the lamp, and it would be necessary to stop testing operations at intervals, shut off the current, or wait for the fixture to cool. Thus, the devices of the prior art are not suited to test a large number of gloves in rapid sequence. One of the objects of my invention is to provide a device which strongly illuminates the glove without overheating it. Another object is to provide novel means for cooling the glove-holding fixture.

Another object of my invention is to provide an improved fixture for clamping the glove in position for inspection and testing. Another object is to provide apparatus having convenient means for testing a single glove finger or a small sheath. Another object is to provide a device which has associated fixtures for testing a whole glove and for more carefully testing the separate fingers thereof.

Another object is to avoid the necessity of using flasks of high pressure gas, and to provide an easily operated, light-weight, self contained apparatus.

The above objects I accomplish by: (1) providing a unit having its own motor-driven air pump for supplying air at the pressure and volume required for testing; (2) providing a glove-test fixture comprising an enclosed lamp-well, a clamp for fastening thereto the wrist of a glove to be tested, an electric lamp in said lamp-well, a window in said lamp-well through which the lamp illuminates the glove, and a channel in said fixture for supplying air therethrough to inflate said glove; (3) providing means for cooling said fixture; (4) providing an additional illuminated inflating fixture of novel design for conveniently testing a finger of a glove or a similar article of rubber-like material; and (5) providing novel and convenient manual means for controlling the flow of inflation air to each of said fixtures and the lighting of the lamps therein during the periods, respectively for each fixture, when such flow is desired and when the illumination by each is desired. Suitable indicator lights are preferably also provided for indicating the operating condition of the apparatus. This apparatus is self-contained, light in weight, and can be plugged into any standard electric socket, ready for immediate use.

Other objects and advantages of my invention will be apparent from the following description and from the appended drawings in which.

Figure 1:
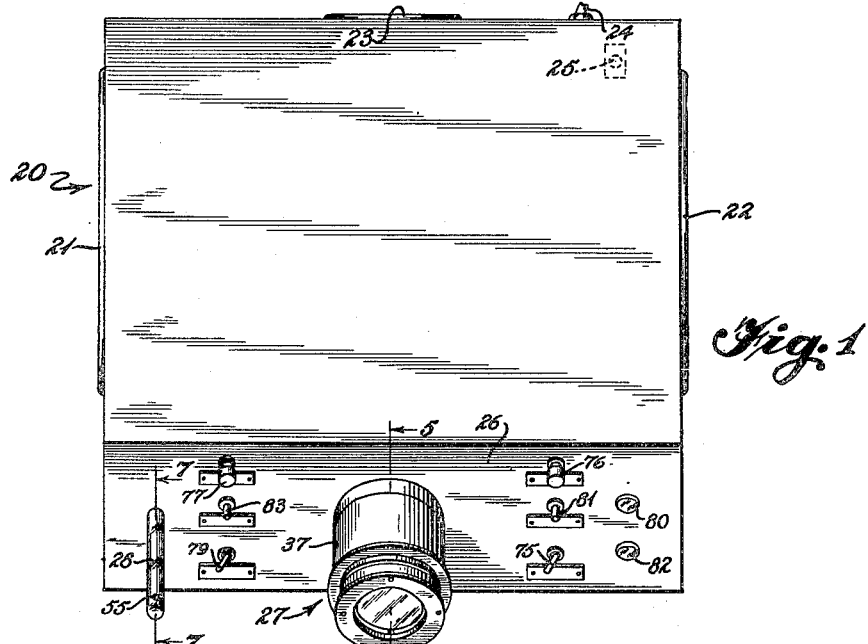
Fig. 1 is a plan view of a novel apparatus made in accordance with my invention.
Figure 2:
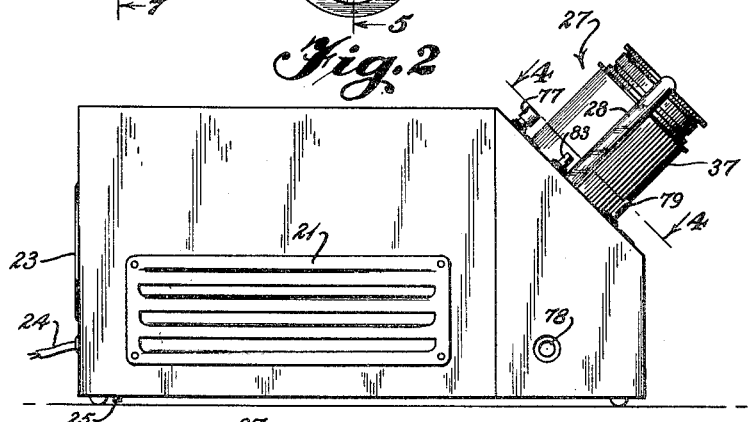
Fig. 2 is a side elevation of the same.
Figure 3:
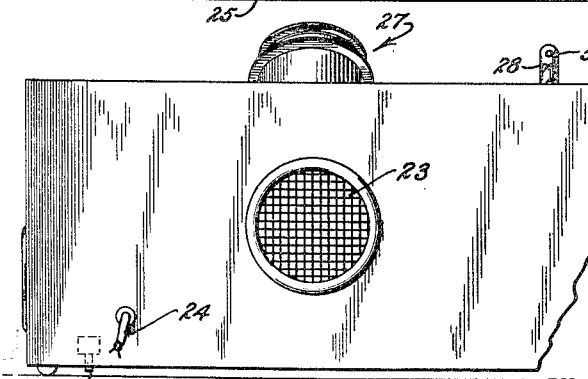
Fig. 3 is a fragmentary rear elevation of the same.
Figures 9A, 9B:
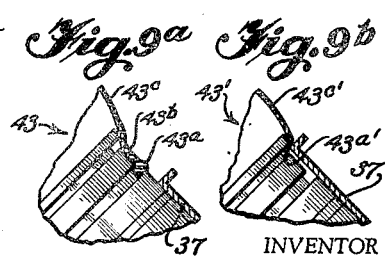

Fig. 4 is an inclined view, taken approximately on line 4—4 of Fig. 2, showing the inclined face of the instrument with lamp enclosure 29 and glove holding sleeve 37 removed;

Fig. 5 is a vertical section taken on line 5—5 of Fig. 1;

Fig. 6 is a section taken on line 6—6 of Fig. 5;

Fig. 7 is a fragmentary section taken on line 7—7 of Fig. 1;

Fig. 8 is a section taken on line 8—8 of Fig. 7;

Fig. 9 is a fragmentary section taken on the same plane as that for Fig. 5 showing a fragmentary inner portion of one type of glove in position on the fixture of Fig. 5;

Fig. 9a is a fragmentary portion similar to Fig. 9, with clamp sleeve 37 in its lower or inward position;

Fig. 9b is a view similar to a portion of Fig. 9, showing a portion of another type of glove held by the same fixture;

Fig. 10 is a wiring diagram of the apparatus shown in Figs. 1 to 9.

Referring now to the drawings, wherein like characters indicate the same or similar parts, there is shown a device made in accordance with my invention, generally designated 20, comprising a cabinet having side louvers 21 and 22 and a screened opening 23 at the back. An electric cord 24 leads in through the back, providing means whereby power may be supplied to the device through an ordinary electric wall socket. A switch 25 under the cabinet adjacent one corner thereof is provided for turning power on and off.

The cabinet has an inclined front face or panel 26 on which are mounted a glove testing fixture 27, a finger testing fixture 28, and suitable switches and indicator lights described below.

Glove testing fixture 27 comprises a tubular member 29 threadedly mounted as at 30 on a base member 31 which is, in turn, mounted on panel or support 26 and held thereon by a pipe 32 which extends through base 31 and panel 26. Pipe or conduit 32 is threaded at each end, and a nut mounted on each threaded end provides means for holding the fixture firmly on the face of panel 26. Under the outer of these nuts a bracket 33 is also fixed, and on the end of this bracket there is mounted a socket for a bulb 34 which provides interior illumination for a glove to be tested and inspected. I prefer to use a 32 candle-power bulb at 34; this provides excellent illumination of a rubber surgical glove. A window 36 is mounted in the outer end of tubular member 29 and held therein by air-tight gaskets to provide a lamp housing having a lamp well 60 for bulb 34, the light from which shines outwardly through window 36 to illuminate a glove mounted on fixture 27 and extending outwardly therefrom when inflated. Pipe 32, which is open at its lower end to the atmosphere within cabinet 20 and open at its upper end into lamp-well 60, constitutes a conduit for wires 35 to lamp 34, and also constitutes a passageway for air entering lamp well 60 to cool fixture 27, as will be explained below.

Novel clamping means is provided for clamping the wrist end of a glove on the end of fixture 27, comprising a slidable sleeve 37 having an outer flange 37a. An O-ring 38 recessed in the outer surface of tubular member 29 frictionally engages the inner surface of sleeve 37 so as to hold it in any position in which it is slid longitudinally on tubular member 29. A flange 39 on the outer end of tubular member 29 has a larger external diameter than the inner diameter of sleeve 37, and thus provides a positive stop for the latter's outward movement. Inwardly of flange 39, tubular member 29 has a portion of reduced diameter 40. The diameter of portion 40 is slightly smaller than the outer diameter of tubular member 29 on which sleeve 37 is slidably mounted, the difference in diameter being sufficient to accommodate the thickened wrist portion of one conventional type of glove 43, a fragmentary portion of which is shown in Fig. 9a. Space is thus provided between the outer diameter of 40 and the inner diameter of sleeve 37 to accommodate the thickened wrist portion 43b in this particular type of glove, the main portion 43c of which is even thinner than indicated, and which has a thick rim or ring 43a at the extremity.

On each side of depressed cylindrical surface 40 there is a still further depressed annular groove, groove 41 between flange 39 and the cylindrical portion 40, and groove 42 between the cylindrical portion 40 and the lower portion of tubular member 29. Grooves or annular recesses 41 and 42 are of a size to receive the wrist rim or ring of a glove. Groove 42 is adapted to receive the rim 43a of the type of glove illustrated in Fig. 9a, and groove 41 is adapted to receive the rim or "ring" 43a' of the type of glove 43' illustrated in Fig. 9b. In this latter type of glove there is no thickened wrist portion other than the ring portion 43a', and the main portion 43c' is very thin. Fig. 9b illustrates how this type of glove is held in the fixture.

The configuration of the depressed portion 40 and of the adjacent grooves 41 and 42, in cooperation with sleeve 37, provides a convenient clamp for firmly attaching the various types of surgical gloves in use, as well as other rubber gloves having thickened wrist portions.

Suitable passageways are provided for supplying air under pressure to the interior of a glove clamped on the end of fixture 27, comprising a plurality of channels 44 extending outwardly through tubular body 29 from an annular recess 45 in the outer surface of base member 31. A passageway 46 is provided through base 31 and panel 26, and this connects with a fitting 47 inside the panel which in turn is connected to a plastic tube 48 from air supply means which will be described below.

Thus a fixture is provided for clamping the wrist portion of a rubber glove to be tested, an enclosed lamp is provided for illuminating the interior of the glove so clamped, and channels are provided for supplying air to the interior of the glove to inflate it for inspection purposes.

As mentioned above, open-ended pipe 32 provides means for supplying air to the lamp well 60 enclosed by tubular member 29 and window 36. Means is provided for circulating air into said lamp well and outwardly through the wall of tubular member 29 to cool fixture 27, so as not to overheat the portion of a rubber glove in contact with fixture 27. This means comprises a plurality of channels 56 (see Fig. 6) which extend inwardly from enlarged outer space 60' of lamp well 60 (see Fig. 5), and down through tubular member 29 to an annular recess 57 on the outer face of base member 31. Annular groove portion 57 is radially inwardly of groove 45. An aperture 58 extends from annular groove 57 inwardly through base 31 and panel 26 (see Fig. 4). This connects with a suitable vacuum pipe 59 (see Fig. 10). Thus, when vacuum is applied to line 59, air is drawn into lamp well 60 through pipe 32 and is then drawn out of lamp well 60 through passageways 56. This provides means for cooling fixture 27 to prevent it from overheating the portions of the rubber glove clamped thereto.

A suitable fixture is also provided for testing an individual finger, this means being best shown in Fig. 7 and comprising a transparent or translucent tubular member 49 which is threaded into a base member 50. Member 49 extends through panel 26, and base member 50 is secured to the underside of panel 26 by means not shown. Finger testing fixture 49 is hollow, and is closed at the outer end and open at the inner end. Disposed within fixture 49 near its outer end is a small light bulb 51 at the end of wires 52. These wires extend through base member 50 as illustrated and outwardly to bulb 51 to support it mechanically and supply current for lighting it. For supplying inflating air, a fitting 53 is threaded into base 50 and in communication with the hollow interior of fixture 49. A suitable tube 54 attached to fitting 53 leads from a source of air for inflating. Near the outer end of fixture 49 are a pair of small holes 55. Thus, a hollow rubber finger or similar member to be tested may be held over fixture 49, its inner portion being held firmly against member 49 by the hand of the operator, and said finger may be inflated by air supplied through holes 55. At the same time, bulb 51 may be turned on by means to be described below to illuminate the interior of the finger for inspection purposes.

Vacuum line 59 is connected to the suction side of an air pump 61 driven by motor 62, which runs continuously during normal operation. The discharge pipe from pump 61 leads to a manifold 64 to which are connected one or more air bottles 65. A relief valve 66 limits the pressure in the manifold and in the air bottles. It also limits the pressure of inflating air supplied to fixtures 27 and 28 through air supply lines 48 and 54 respectively. The capacity of the air bottles and the setting of relief valve 66 are chosen so as to provide a small reserve supply of air in bottles 65 under the desired pressure for quickly inflating a glove to be tested. For this purpose, I have found a bottle capacity of about 2 liters, and a relief valve setting of about 22 pounds per square inch to be satisfactory. This provides just enough air reserve to quickly inflate an average size glove without waiting for pump 61 to build up the necessary pressure. A larger reserve supply of air is unnecessary. Pump 61 and motor 62 have capacity in excess of that necessary for inflation purposes, so that during normal operations when the glove is inflated the air supply in bottle 65 is quickly supplied, pressure built back up to relief valve pressure, and air then released through release valve 66. The air pump 61 continues to pump air, and the release of air through relief valve 66 continues until the next glove or finger is inflated. As a consequence, except during the very brief intervals when the pump is replenishing air withdrawn for inflation purposes, air is being released through the relief valve 66. Thus, a flow is established for continuously drawing air into lamp well 60 and out through the walls of tubular member 29 to cool it, and much of this flow of air is dumped out relief valve 66. Pump 61 is thus both an air circulating pump and an air supply pump. The air which is used for inflation is only very slightly heated, and this heating has no adverse effect on the rubber being tested.

A normally closed valve 67 is provided in air supply line 48 from manifold 64. A solenoid 68 is connected to valve 67 for opening it when desired by control means to be described below. Similarly, a normally closed valve 69 is provided in air supply line 54 to finger testing fixture 28, and a solenoid 70 connected to valve 69 is provided for opening said valve to supply air to fixture 28 when desired, by control means to be described below. For convenience of assembly and servicing, cabinet 20 and the parts and wiring indicated schematically in Fig. 10 are fabricated in two connected portions. The parts in the lower portion of Fig. 10 at 71 are located in the back portion of cabinet 20 and physically attached thereto. The parts above those indicated at 71 are located in the front portion of cabinet 20 and are physically attached thereto. The air supply and vacuum lines 48, 54, and 59 are flexible hoses which may readily be connected and disconnected respectively to valves 67, 69, and pump 61. The electrical connections between the two sections are made by connecting the male and female plug-socket members 72 and 73. For convenience in tracing the wiring circuits, the corresponding contacts of plug 72 and of socket 73 are identically numbered.

I prefer to use automotive type electric light bulbs for glove and finger illumination purposes because the bulb and socket sizes are smaller than those of conventional electric lamps, and stronger lamps are available in these small sizes. To energize them, I provide a transformer 74, the primary of which is energized as follows: Supply wire 101 is connected with contact 2 of socket 73. Contact 2 of plug 72 is connected to contact 102 of switch 75 which in the operative or "power on" position is in the right-hand position of Fig. 10, connecting contact 102 with contact 103. Contact 103 connects with line 104 to primary side 105 of transformer 74. The other side 106 of this primary is connected to contact 4 of plug 72. Contact 4 of socket 73 is connected through line 107 with switch 25 and thence to the other supply lead 108.

The secondary of transformer 74 provides 12 volts across terminals 109 and 111, with an intermediate lead 110 for providing 6 volt current. When glove light switch 76 is closed, glove illuminating bulb 34 is energized through the following circuit: from transformer secondary lead 111 to connection 112, through lamp 34 to connection 113, through switch 76 to contact 114, and to the opposite terminal 109 of the secondary winding. Similarly, when finger light switch 77 is closed, finger light bulb is energized through the following circuit: from secondary terminal 111 to connection 115, through light bulb 51, and switch 77 to connection 116, and from there back to the opposite terminal 109 of the secondary.

In addition to the switches 76 and 77 for turning on lamps 34 and 51 respectively, a foot-operated switch is conveniently provided so that the operator may use his foot to turn the desired lamp on for only the minimum time that it is wanted, leaving his hands free for testing purposes. A selective switch 79 is provided, and when this switch is thrown so as to make contact with contact 117 thereof, and when the foot operated switch connected with jack 78 is closed, bulb 34 is energized as follows: from terminal 111 of the secondary to connection 112, through lamp 34 to connection 113, to contact 117 of switch 79 and through the switch to contact 118 thereof, to jack 78, through the foot operated switch (not shown) through line 119 to connection 114, and from there back to terminal 109 on the opposite side of the secondary.

When switch 79 is thrown to make contact with contact 120, and when the foot-operated switch connected to jack 78 is closed, bulb 51 of the finger fixture 28 is energized as follows: from secondary terminal 111 to connection 115, through bulb 51 to connection 121, to switch 79, through contacts 120 and 118 to jack 78, through line 119 to connection 114 and from there back to terminal 109.

When main switch 25 and power switch 75 are in the on position, that is with contacts 102 and 103 connected, motor 62 is also energized through the following circuit: from supply lead 101 to contact 2 of socket 73, from contact 2 of plug 72 to contact 102 of switch 75, thence through contact 103 to line 104, to contact 1 of plug 72, from contact 1 of socket 73 to motor 62, through the motor to switch 25 and the opposite power lead 108.

As explained above, when main switch 25 is closed and when the "power" switch 75 is in the "on" position, that is with contacts 102 and 103 connected, transformer 74 and motor 62 are both energized. Indicating means is provided for showing when the system is thus energized, comprising an indicator light 80 for which I use a 6 volt lamp behind a green glass window. Whenever the primary of transformer 74 is energized, lamp 80 is directly across terminals 110 and 111 of the secondary transformer 74, thus lighting lamp 80.

Means is also provided for opening valve 67 to admit air to supply pipe 48 for inflating a glove to be tested through the passageways described above for glove fixture 27. This comprises a circuit for energizing solenoid 68 to open valve 67 whenever desired. With main switch 25 closed, and power switch 75 in the "on" position, this is done by closing glove air switch 81 to complete a circuit as follows: From power lead 101 to contact 2 of socket 73; from contact 2 of plug 72 and through switch 75 to contact 103 thereof; to and through switch 81 to lead 122 and thence to contact 6 of plug 72; from contact 6 of socket 73 to and through solenoid 68; thence return by line 107 through switch 25 to the opposite power lead 108.

A separate finger air switch 83 is provided to establish a circuit to energize solenoid 70 and open valve 69 to admit air under pressure through line 54 to finger testing fixture 28 for inflating a finger or the like held thereon. The circuit is as follows: from power lead 101 to contact 2 of socket 73; from contact 2 of plug 72 to and through switch 75 to contact 103 thereof; through line 104 to connection 125; through switch 83 to contact 7 of plug 72; from contact 7 of socket 73 to and through solenoid 70; and return to the opposite side of the line 108 through lead 107 and switch 25. If desired, a circuit could also be provided through blinking red signal lamp 82, but this is unnecessary and is not provided in the preferred embodiment as shown.

It is desirable to provide means for exhausting air from the system, and this may be done by throwing the power switch 75 to the "off" position before opening the main switch 25. Referring to Fig. 10, the effect of this is to cut power off from motor 62 and from transformer 74, and at the same time to short circuit or by-pass switch 81, thus supplying electricity from power lead 101 to leads 122 and 123. As explained above for the condition when glove air switch 81 is closed, circuits are thus established through solenoid 68, which opens valve 67 and exhausts air from bottles 65 and manifold 64, and at the same time to cause red indicator lamp 82 to blink. It takes only a few seconds to exhaust the air from the system. Main switch 25 is then opened to de-energize the entire apparatus.

With respect to indicator lamps 80 and 82, it is to be noted that whenever main switch 25 is closed at least one of these lamps will be lighted. This is because power switch 75 is a two-position toggle switch and cannot be left open. Whenever it is in the "on" position green light 80 is on, indicating that motor 62 and transformer 74 are energized and that the apparatus is ready for operation. Blinking red signal lamp 82 indicates that valve 67 is open and that air is being released through line 48. When switch 75 is in the "on" position, main switch 25 is closed, and switch 81 is also closed, green light 80 is on indicating that motor 62 is functioning to supply air under pressure to the system, and transformer 74 is energized to supply current to the indicator 80 and glove lights 34 and 51. When switch 75 is turned to the "off" position with main switch 25 closed, green indicator lamp 80 is off, but blinking red light 82 is on, thus indicating that motor 62 is not operating to keep the system charged with air, but that valve 67 is open to exhaust air from the system. Circuit is established through line 123, blinker element 124 and lamp 82 to contact 4 of plug 72; from contact 4 of socket 73 to line 107, and thence to the opposite power lead 108 through switch 25. Thus air is admitted through line 48 to fixture 27 to release air from the system and at the same time lamp 82 is flashed. Lamp bulb 82 is covered by a red window, so that a red flashing signal is given when air is being admitted through line 48 even though the rest of the electrical system is de-energized. When both lamps 80 and 82 are off, it shows that switch 25 is opened and that the system is electrically de-energized.

The operation of the system is as follows: Power leads 101 and 108 being connected to an electric power source, switch 25 is closed and switch 75 is moved to the "on" position. Green lamp 80 lights up, showing that the apparatus is ready for testing operations. A glove may be clamped in position on fixture 27 as explained above and illustrated in Fig. 9. Foot selector light switch 79 is turned to the "glove" position. The operator presses "glove air" switch 81. As explained above, this causes inflation air to be admitted to the glove to inflate it. As soon as the glove has inflated to the desired amount, the operator releases switch 81 shutting off the supply of air to the glove. He now steps on the foot switch, thereby lighting bulb 34 to illuminate the interior of the glove. The operator then inspects the glove for leaks, and if any are found, marks them for repair or sets the glove aside for rejection. The lamp 34 is preferably left on only long enough to complete the inspection, when the foot switch is released to open the circuit and turn off the lamp. Instead of using the foot switch to turn on light 34, the operator may simply push down on "glove light" switch 76. This turns on lamp 34 and leaves the circuit closed until switch 76 is pressed a second time to open it, this switch being of the type which stays closed until it is pressed a second time.

If it is found desirable to test an individual finger, the glove is removed from fixture 27, foot selector light switch 79 is shifted to "finger," the operator places the selected finger over fixture 28, and squeezes the base of the finger tightly against fixture 28. Finger air switch 83 is then pressed long enough to inflate the finger, air being supplied to fixture 28 as described above. When the desired degree of inflation has been attained, and foot selector light switch 79 having been shifted to "finger," the foot switch is pressed to light bulb 51 and held down long enough to complete the inspection. If preferred, button 77 may be pressed instead of the foot switch. This closes the circuit to bulb 51 and keeps it closed until button 77 is pressed a second time.

Fixture 28, may, of course, be used to test any small rubber enclosure which may be held on fixture 28. Similarly, fixture 27 may be used to test larger enclosures other than gloves.

It will be apparent to those skilled in the art that I have provided a novel testing apparatus for rubber gloves and the like which is compact and self contained and which is provided with convenient control switches for rapid testing, during which inflation air and illumination are supplied only during the desired steps of the testing sequence. There is no need for providing or changing flasks of compressed air. A large number of gloves may be tested in rapid sequence without the necessity experienced with prior art devices of stopping operations frequently to cool the apparatus, so that a higher rate of units tested per unit of time is attainable. Positive means are provided for keeping glove fixture 27 sufficiently cooled so that rubber held in close contact therewith will not be damaged.

As various possible embodiments might be made of my invention and as various changes might be made in the embodiment described, it is to be understood that all matter herein set forth or shown in the accompanying drawings is to be interpreted as illustrative and not in a limiting sense.

I claim as my invention:

1. Apparatus for testing a flexible glove, said glove being closed except for an opening at its wrist portion and having a rim surrounding said opening, comprising a lamp housing, means for clamping said glove to said housing with said rim around said housing, an inflation channel through said housing to the space enclosed by said glove beyond said housing, a motor-driven air pump, a pressure channel connecting the discharge side of said pump to said inflation channel, a normally closed glove air valve in said pressure channel for controlling the flow of air to said glove, a solenoid connected to said valve for opening said valve when said solenoid is energized, an electric circuit for energizing said solenoid, a glove air switch in said circuit for closing said circuit, said housing having an opening into its interior from the surrounding atmosphere and a side wall with a cooling channel in said side wall, said cooling channel having a suction end leading from the interior of said lamp housing and a discharge end leading to a suction pipe, said suction pipe connecting the discharge end of said cooling channel with the suction side of said air pump, a lamp in said housing and means for lighting said lamp, said housing having a light-pervious window for illuminating the interior of a glove clamped to said housing; whereby a glove may be clamped to said housing and may be inflated, illuminated and inspected, and said lamp housing may be cooled to prevent it from overheating said glove.

2. Glove testing apparatus in accordance with claim 1 having a relief valve in the discharge side of said pump, said means to light said glove lamp comprising a glove lamp circuit with a foot operated switch therein, said lamp housing comprising a hollow cylindrical member having an inner end mounted on a support and an outer end remote from said support, said lamp housing having an annular recess therein in the outer cylindrical surface thereof adjacent said outer end, said recess being adapted to receive said glove rim snugly, a sleeve slidably mounted on said cylindrical member, said sleeve having an outer position covering said recess to clamp said glove to said lamp housing with said rim in said recess and an inner position uncovering said recess for placing a glove on said housing and removing it therefrom.

References Cited in the file of this patent

UNITED STATES PATENTS

| | | |
|---|---|---|
| 2,074,140 | Bates | Mar. 16, 1937 |
| 2,370,945 | Fields | Mar. 6, 1945 |
| 2,597,680 | Sissler | May 20, 1952 |
| 2,696,732 | Bryant et al. | Dec. 14, 1954 |